(12) United States Patent
Kussel

(10) Patent No.: US 7,357,152 B2
(45) Date of Patent: Apr. 15, 2008

(54) RELEASABLE NON-RETURN VALVE

(75) Inventor: Willi Kussel, Werne (DE)

(73) Assignee: Tiefenbach Control Systems GmbH, Essen (DE)

( * ) Notice: Subject to any disclaimer, the term of this patent is extended or adjusted under 35 U.S.C. 154(b) by 0 days.

(21) Appl. No.: 11/622,286

(22) Filed: Jan. 11, 2007

(65) Prior Publication Data

US 2007/0157971 A1  Jul. 12, 2007

Related U.S. Application Data

(63) Continuation of application No. PCT/DE2005/001169, filed on Jul. 12, 2004.

(30) Foreign Application Priority Data

Jul. 12, 2004  (DE) .................... 10 2004 033 778

(51) Int. Cl.
*F16K 15/18* (2006.01)
*F15B 13/01* (2006.01)

(52) U.S. Cl. .................... 137/522; 251/63.4; 251/63.5; 91/420

(58) Field of Classification Search .............. 137/522; 251/63.4, 63.5; 91/420
See application file for complete search history.

(56) References Cited

U.S. PATENT DOCUMENTS 3,631,888 A * 1/1972 Anton et al. ................ 137/522
3,906,991 A * 9/1975 Haussler ................ 137/630.13
4,172,582 A * 10/1979 Bobnar ..................... 251/63
4,361,075 A * 11/1982 Block ........................ 91/420
4,624,445 A * 11/1986 Putnam ................... 251/63.4
5,255,712 A    10/1993 Foster
5,540,258 A *  7/1996 Cho ...................... 137/596.2
5,913,810 A *  6/1999 Andre ...................... 60/420
6,073,654 A *  6/2000 Dettmers et al. ...... 137/630.15
6,488,258 B1* 12/2002 Dantlgraber et al. ...... 251/63.6

FOREIGN PATENT DOCUMENTS

| DE | 1 814 214 | 7/1970 |
| DE | 25 44 579 | 4/1977 |
| DE | 199 56 379 | 5/2001 |
| EP | 0 595 427 | 5/1994 |

* cited by examiner

*Primary Examiner*—Ramesh Krishnamurthy
(74) *Attorney, Agent, or Firm*—Alston & Bird LLP

(57) ABSTRACT

The invention relates to a releasable non-return valve, in which a connection between a working chamber and a connector chamber may be closed by a non-return piston and opened by the opening movement of a release piston which may be pressurized with a release pressure. The non-return piston, discharge piston and release piston are arranged concentric to each other with the release shaft in the common valve axis. The valve has a cartridge embodiment with a non-return valve cartridge which may be inserted in the valve housing and a discharge valve cartridge independent of the non-return valve cartridge. The release shaft extends through the non-return piston with a sliding seal and engages behind the piston base by means of a stepped diameter for opening. The discharge piston is pressure compensated on both sides by pressurization with the working pressure.

13 Claims, 4 Drawing Sheets

RELEASABLE NON-RETURN VALVE

CROSS REFERENCE TO RELATED APPLICATION

The present application is a continuation of international application PCT/DE 2005/001169, filed Jul. 12, 2004, and which designates the U.S. The disclosure of the referenced application is incorporated herein by reference.

BACKGROUND OF THE INVENTION

The invention relates to a releasable non-return valve. A known releasable non-return valve is described in DE 18 14 214 A 1. A valve of this type serves, for example, for controlling and hydraulically securing the walking support in underground mining. In the closed state the non-return piston serves to secure against the more than 400 bar operating pressure of the hydraulic ram. For drawing the walking support frame the non-return piston can be released hydraulically in order to produce a connection between the operating space at high operating pressure, e.g., the hydraulic ram, and the return line.

Valves of this type, due to their use in underground mining, must, on the one hand, meet very high reliability requirements. On the other hand, when using water as hydraulic fluid, valves of this type are subjected to high load due to the extremely high pressures, the very large amounts of fluid, and the high frequency of shifting. For this reason, the wear-prone parts of these valves are implemented in the form of cartridges. As such a valve cartridge, an essentially cylindrical body is inserted into the valve housing, which is usually a valve block into which several valve holes for several valves are introduced, where in said essentially cylindrical body the valve pistons are guided and the valve seats and valve chambers are formed. In case of wear or after the expiration of the fixed service lifetime, the cartridges with the valve pistons guided therein can then be removed from the valve housing or valve block and replaced.

In the known non-return valve a discharge valve is provided which produces, through the action of the release piston, a throttled connection between the non-return valve's working chamber, which is under very high operating pressure, and the connector chamber connected to the return line before the non-return piston is lifted from its seat and a large flow cross section between the working chamber and the connector chamber is released. Through this discharge valve it is possible, first, to reduce, at least in part, the pressure of the operating space and the working chamber and thereby, when opening the large flow cross section, to avoid high pressure differentials and flow rates. In the known valve, the discharge valve is mounted in the non-return piston so that the discharge valve always has to be mounted and dismounted together with the non-return valve, even though their service lifetimes, due to their different loads, are clearly different.

It is an objective of the invention to extend the known valve in such a manner that the non-return valve and the discharge valve do in fact work together in the desired manner with regard to their function but are independent of one another with regard to their structural implementation and, in particular, can be replaced independently of one another.

SUMMARY OF THE INVENTION

The above objective and others are realized according to the invention by providing, in one embodiment, a releasable non-return valve, comprising a non-return piston and a discharge piston, configured to open and close a connection between a working chamber and a connector chamber, wherein each of the non-return piston and the discharge piston may be held in a closed position by a closing spring and a working pressure, and a release piston having a release shaft, that executes a release movement upon pressurization with a release pressure, wherein the release shaft engages the discharge piston and the non-return piston in a form-locking manner by means of a free apical face of the release shaft such that the discharge piston and the non-return piston are impelled into respective open positions, the non-return piston, the discharge piston, and the release piston with the release shaft being disposed so as to be concentric to one another on a common valve axis, wherein the release shaft extends through the non-return piston in such a manner that it can slide with sealing and, for opening, engages a non-return piston base by means of a diameter tier, the non-return piston is loaded in a closing direction by a main closing spring, and the discharge piston is guided in such a manner that it can move independently on the valve axis opposite a free end of the release shaft.

According to the invention the non-return valve, the discharge valve, and the release piston are disposed on the axis of the valve. The non-return valve and the discharge valve each comprise a piston which in each case is loaded by a spring and, depending on the type of non-return valve, in each case lies on a seat. Both the non-return valve and the discharge valve can, independently of one another, be moved in the same direction and lifted from their seat. If they are lifted from their seat against the force of the respective spring, each of them connects the valve housing's working chamber, in which the working pressure prevailing in the consumer is present, to a return duct of the valve housing. The non-return valve is disposed between the release piston and the discharge valve. The release piston is connected to the release shaft in a fixed manner at the center of the apical side at which the release piston is pressurized with the working pressure. The release shaft extends along the valve axis, runs through the piston of the non-return valve, and ends with its free apical face just in front of the discharge piston. The release shaft is formed in such a manner that it can slide with sealing in the base of the non-return valve. However, it comprises, on its circumferential surface, a projection, which projects out beyond the release shaft's part sliding in the piston base. Said projection can, for example, be a diameter tier but can also be a pin introduced into the piston shaft so as to be perpendicular to its axis, said pin projecting beyond the release shaft's circumferential surface sliding in the piston base. The release shaft is dimensioned in such a manner that, during its movement in the direction of the discharge valve, the release shaft first strikes its piston base, or a projection formed thereon, and, on further movement, lifts the piston from its seat. Thereby, only a narrow connection between the working chamber and the return chamber is established. Only then does said projection arrive in front of the piston base of the non-return valve and, in its further movement, also entrain its piston. Along with this, the release piston is pressurized in the opening direction with the pilot pressure, preferably the operating pressure of the hydraulic system, and on the other side with the working pressure. Its movement in the opening direction is furthermore opposed by the springs on the described piston, which press it in the closing direction onto its respective seat. The dimensioning of the piston faces on the release piston and the springs of the non-return valve and the discharge valve is done in such a manner that the release piston can first lift only the piston of the discharge valve. Only when the working pressure on the release piston's side acting in the opposite direction has fallen far enough, does the release piston, due to the pilot pressure or the system pressure, move, against the spring forces, further in the opening direction and, with said projection, also lift the piston of the non-return valve from its seat. Then a large-surface connection between the working chamber and the return duct is established.

The return duct can also be connected by a switch-over valve to the pump duct. Thereby, the piston base of the non-return valve is pressurized with the system pressure and lifted from its seat. At the same time, the release piston is also pressurized on its rear side with the system pressure and preferably relieved on the other side. Due to this, the release piston traverses back so that the piston of the discharge valve is closed, depending on the pressure, due to the force of the spring and the piston of the non-return valve assumes its normal function of a non-return valve and only remains open so long as the pressure on its lower side is greater than the working pressure on the closing side.

The non-return valve and discharge valve are implemented in the form of a cartridge, each with its own cartridge, where they can be inserted independently of one another into the valve housing in such a manner that they align. The release piston is also accommodated in a cartridge. This can be of one piece with the cartridge of the non-return valve. It is particularly advantageous that the cartridge of the discharge valve, which is particularly subject to wear, can be replaced without the cartridge of the non-return valve and the release piston also being replaced.

Another embodiment serves the purpose of avoiding sealing problems on the discharge valve, and in particular the discharge valve piston, but nevertheless effecting a reliable containment of the working pressure in the chamber. This embodiment is, for a discharge valve in the form of a cartridge, of particular significance since the attachment of cartridges to the working chamber is made possible and, in an unusual manner, flow through the valve or the valve seat is from the small to large diameter side.

Another embodiment ensures a definite resting position of the discharge piston so that reliable closing of the valve seat from any operating position is ensured.

In the known valve it is furthermore not taken into account that even the pilot valve is, on the one hand, subjected to a high load and, on the other hand, is an element which is functionally important for the reliability of the valve, and thus needs regular replacement. The extension according to claim 4 thus has the advantage that the release piston can also be replaced in a simple manner.

Along with this, in another embodiment, the release valve cartridge is preferably formed as one piece with the non-return valve cartridge so that a pilot control piston and the non-return valve form a conjoint component and can be replaced conjointly.

In other embodiments, the discharge valve cartridge can be formed from one piece with a cartridge cap and cartridge bushing. However, in order to simplify production and to limit replacement to the parts subject to wear, the cartridge bushing can also be formed as an independent, hollow, cylindrical guide element which comprises an outer thread and preferably can be screwed into the cartridge cap.

In the valve according to one embodiment of the invention it is advantageous, to avoid sealing problems and to connect the working chamber to the discharge chamber of the discharge valve, that the apical side of the release shaft projects into the working chamber.

Another embodiment serves to guide the release piston reliably, where the advantage of said release piston is the fact that the restoring spring which presses the release piston into its neutral position is comprised in the component.

The known non-return valve permits the working chamber to discharge substantially before the opening of the non-return piston. The degree of this discharge is, for one thing, determined by the surface ratio of the hydraulically active piston surfaces on the release piston on the one hand and the non-return piston on the other hand. Assuming that the control pressure at the release piston and the operating pressure or closing pressure at the non-return piston is the same (system pressure), as is largely the case with the valves used in mining, which simultaneously use the operating pressure as the control pressure, the piston surface at the release piston determines how far the working pressure at the non-return piston has to fall before the non-return piston can be lifted from its seat. Determinative for this, however, is also the strength of the main closing spring, which acts on the non-return piston.

In the known valve the release piston is pressed into its resting position by a restoring spring, where the release piston is not pressure-loaded except in the operating phase of the release. A restoring spring of this type is always desirable to reach a definite resting position. This restoring spring can, however, not be formed in an arbitrary manner since the opening behavior of the valve is affected thereby. Furthermore, it must be avoided that the release piston, which works together with the non-return piston which can slide on it and is supported by it, is unintentionally entrained during the movement of the non-return piston. The invention's development according to another embodiment serves for this purpose, where said development ensures that the release piston is moved from the resting position, in particular in the operating state in which the connector chamber is connected to the pump and the non-return piston lifts from its seat.

Furthermore, the opening behavior of the known non-return valve is determined by the fact that the release piston is only throttled and is pressurized with the control pressure with control by steps.

In another embodiment, with a slow movement of the release piston, the opening of the discharge valve and the gradual reduction of the operating pressure can take place first, before, due to the decrease of the throttle gap between the release piston and release cartridge as a result of the movement of the release piston, the increase in pressure in the control chamber of the release piston is intensified and the control pressure is finally sufficient to lift the non-return piston from its seat.

BRIEF DESCRIPTION OF THE DRAWINGS

Figure 1:
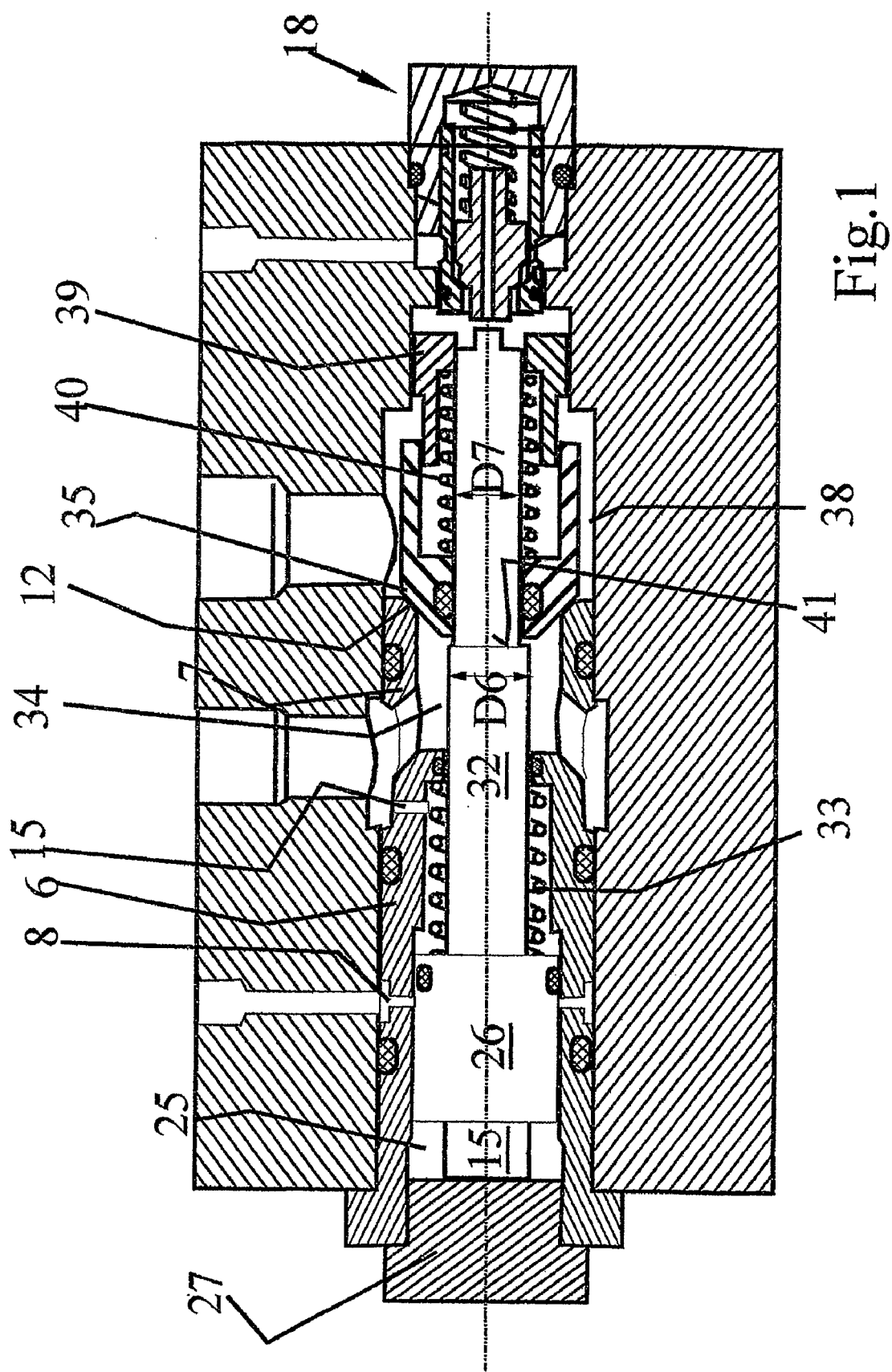
Figure 2:
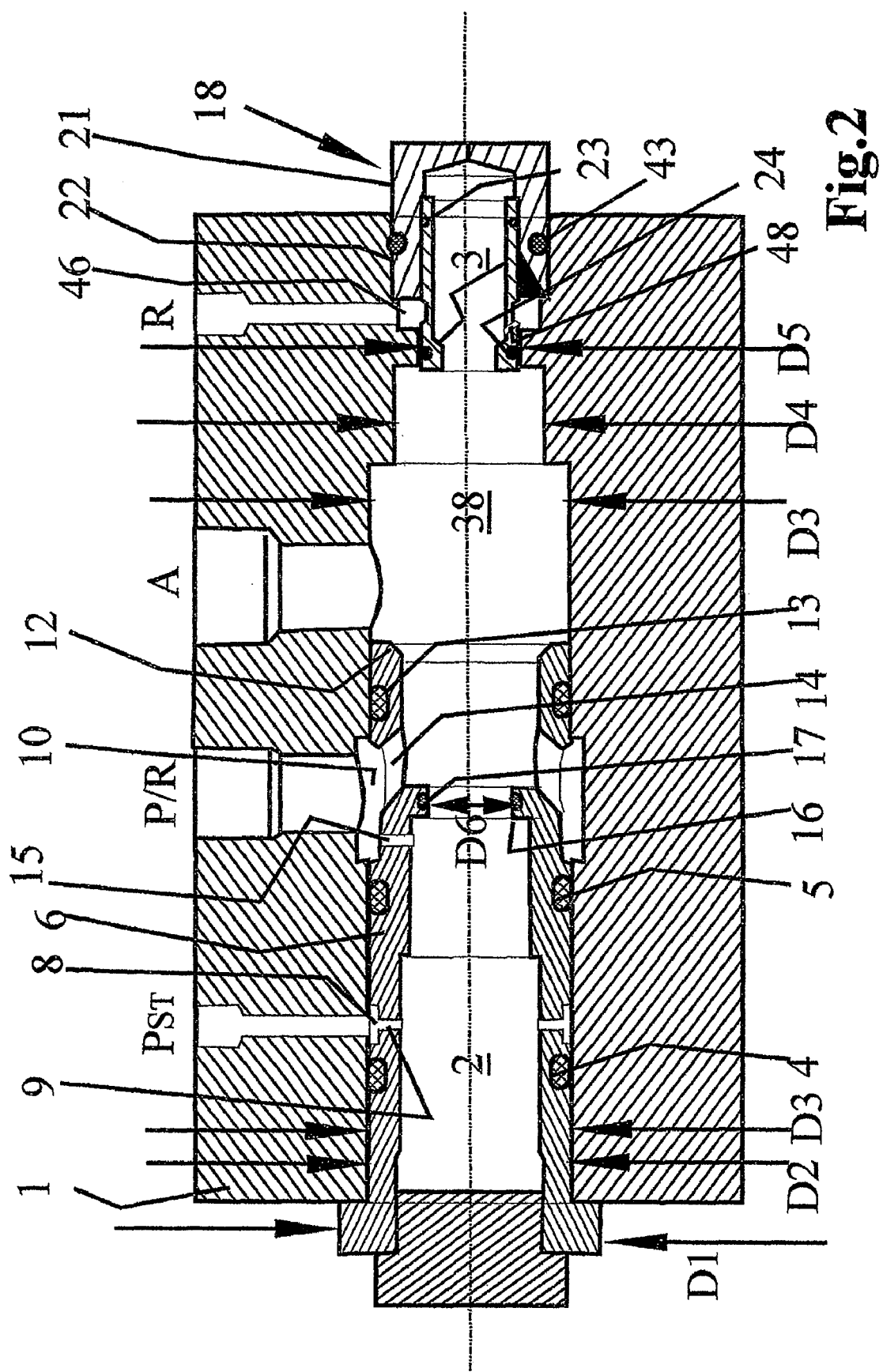
Figure 3:
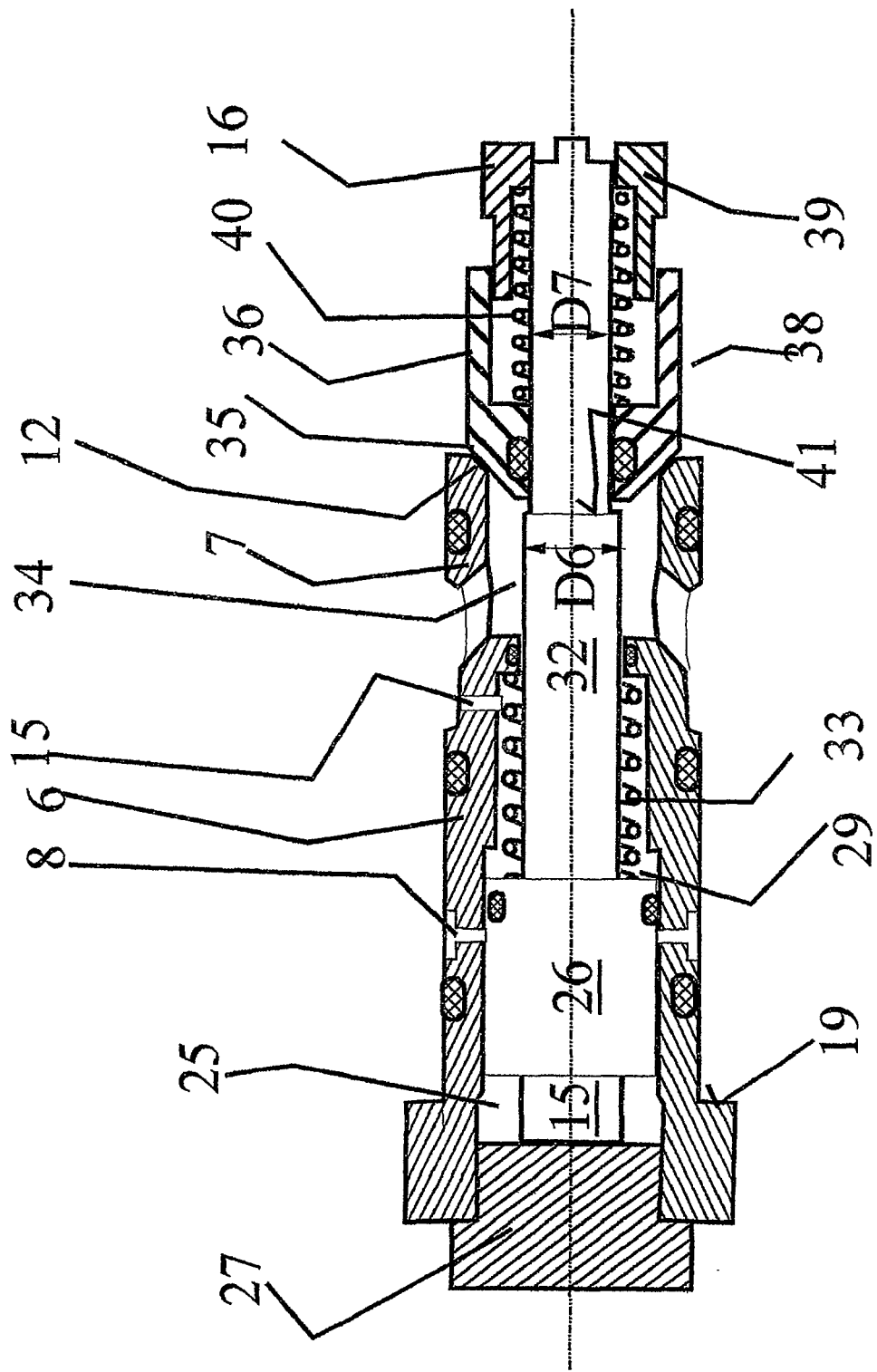
Figure 4:
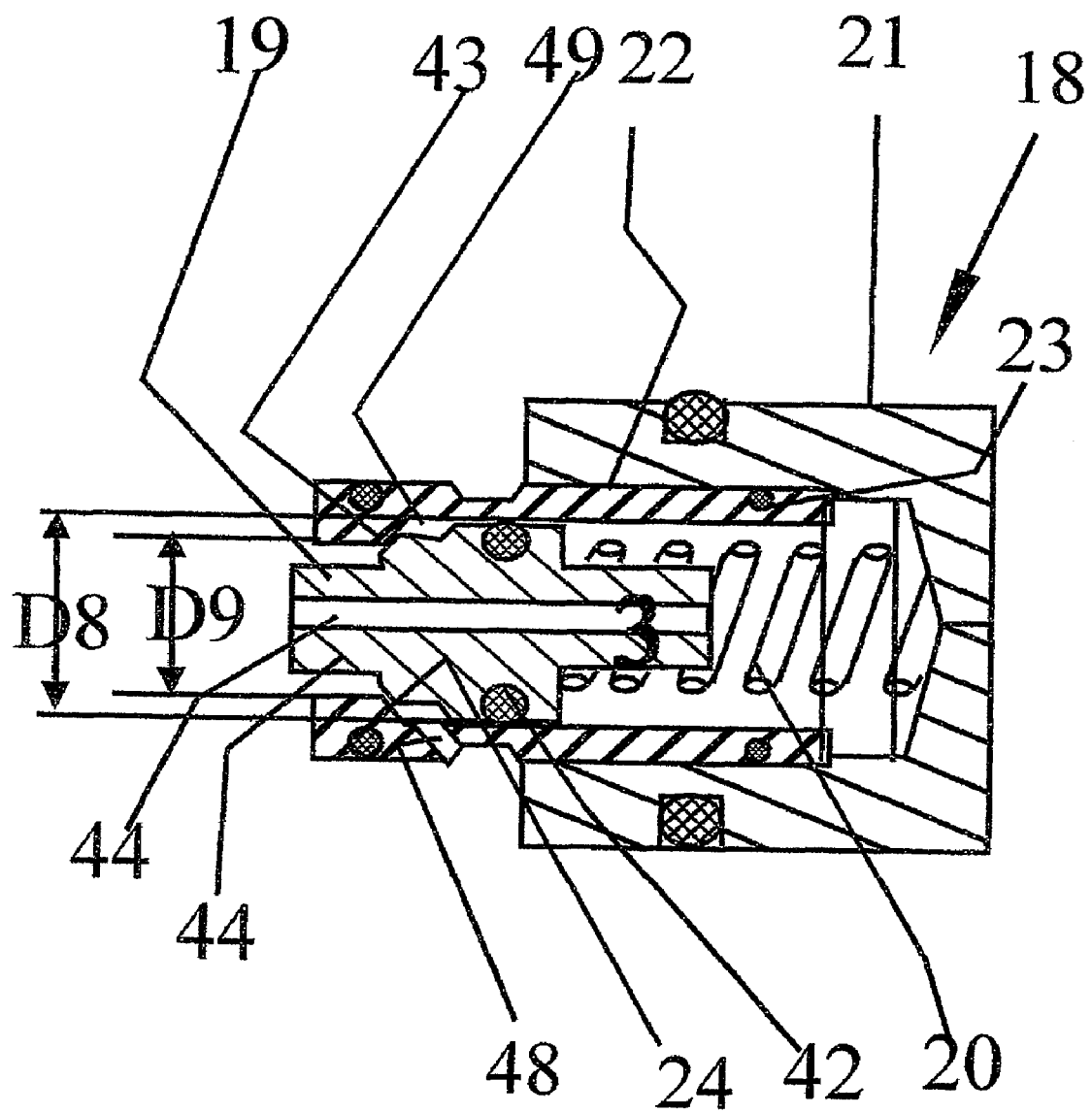

Having thus described the invention in general terms, reference will now be made to the accompanying drawings, which are not necessarily drawn to scale, and wherein:

FIG. 1 shows the valve as a whole;

FIG. 2 shows the valve housing and the cartridges inserted therein for the release piston (release cartridge), for the non-return piston (non-return cartridge), and for the discharge piston (discharge cartridge);

FIG. 3 shows the structural unit of the release piston and non-return piston; and FIG. 4 shows the discharge valve.

DETAILED DESCRIPTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1 and FIG. 2, the valve housing 1 is a steel block in which several holes (not shown) are introduced which, on the one hand, serve to receive its valves and, on the other hand, serve as hydraulic ducts. In the figures only one valve hole of this type with the associated hydraulic ducts PST, P/R is shown. The valve hole 2 is introduced from one side (in the figures the left side) with a diameter tapered in tiers. Into the valve hole the valve cartridge, comprising the release cartridge 6 and the non-return cartridge 7, is inserted from the open side. These cartridges are in the present case made from one piece as a single valve cartridge.

This valve cartridge is a hollow, cylindrical body. The outer diameter is adapted to the diameter tiers of the valve hole 2. The first piece with the greatest diameter D1 projects from the valve hole and serves for grasping by a screw wrench or another gripping tool. Along with this, the end projecting out of the valve hole and having the diameter D1 also serves as a stop. Following this is a second piece with the diameter D2. This comprises an outer thread with which the valve cartridge 2 can be screwed into an inner thread in the corresponding diameter tier of the valve hole. This thread tier with the diameter D2 is followed by the control tier with the smaller diameter D3. This control tier D3 comprises on its outer circumferential surface a sealing ring 4 with which a sealing of the opposite end of the thread of the valve cartridge is effected. Furthermore, this tier comprises on its outer circumferential surface an annular duct 8 which communicates with the previously mentioned control duct port PST of the valve housing 1. From the annular control duct 8 the wall of the release cartridge 6 is penetrated by a control hole 9 whose function will be described later. An additional tier with the smaller diameter D4 can follow the diameter tier D3 and continue up to the apical side of the valve cartridge. In this case the step in the diameter between the tiers D3 and D4 could serve as the stop at a corresponding diameter step in the valve housing 1.

In the present case the axial fastening of the release cartridge 6 to the non-return valve 7 follows from the diameter step D1/D2 on the outer side of the valve housing 1. The cartridge 6, 7 is therefore fastened by screwing into the tier with the diameter D2 and by the stop in the step D1/D2 in the valve housing.

Furthermore, the sealing ring 5 is located on the outer circumferential surface of the valve cartridge 2. Consequently, the annular control duct 8 is sealed on both sides by the sealing rings 4 and 5 on the outer circumferential surface of the release cartridge 6. The non-return tier 7 of the valve cartridge comprises in the area of its apical surface an additional sealing ring 13 on its outer circumferential surface. Between the sealing rings 5 and 13 this non-return cartridge 7 comprises, on its outer circumferential surface, a passage which, with the valve housing, forms the annular duct 10. This annular duct communicates with the previously mentioned duct P/R, which is optionally connected to the pump system or the return line of the longwall by means of a switch-over valve not represented here and serves, in a manner still to be described, as a discharge duct/return duct or pump duct. The wall of the valve cartridge 7 is penetrated in the area of this annular duct 10 by a circle of radial branch lines 14 which communicate with the chamber 34 (FIG. 1) formed in the interior of the valve cartridge.

Furthermore, the valve cartridge in the area of the release cartridge 6 comprises a throttled valve hole 15 which connects the annular duct 10 to the chamber 29 (FIG. 3) formed in the interior of the release cartridge. This chamber is closed by a constriction of the release cartridge 16 with sealing ring 17.

The front apical side 31 of the valve cartridge 2 transitions with a conical surface 12 into the chamber 34 formed in the interior of the valve cartridge. Formed in the valve housing 1 in front of the apical side 11 is a chamber 38 whose diameter corresponds to the smallest outer diameter, here D3 of the non-return cartridge 7. This chamber communicates with the previously mentioned port duct A of the valve housing, said port duct being connected to the operating space of a consumer not represented here, for example, a hydraulic ram for supporting the roof of a support shield.

The valve housing or its hole furthermore comprises, following the chamber with the diameter D3, still another hole section with the smaller diameter D4.

From the other [side] (in FIG. 1 the right side) of the valve block 1 an additional hole 3 with stepped diameter is introduced into the valve housing 1 in such a manner that it is aligned with the valve axis. This hole serves to receive an additional valve, the discharge valve mentioned, which is represented in detail in FIG. 3 and also comprises a valve cartridge. This discharge valve cartridge comprises a cartridge cap 21 and, inserted therein, a cylindrical cartridge bushing 22 which is screwed into the edge of the cartridge cap 21 and, at the outer circumferential surface, is sealed with respect to the inner circumferential surface of the edge of the cartridge cap 21 by the sealing ring 23 and with respect to the narrowest constriction of the valve hole with the diameter D5 by the sealing ring 24. The end of the discharge valve cartridge projects into the plane into which the valve hole 2 with the diameter D4 and the smallest tier of the discharge valve hole 3 with the diameter D5 penetrate. From this side the discharge valve cartridge forms a diameter tier whose diameter D7 is significantly narrowed with respect to the preceding diameter D6. The diameters D6 and D7 transition into one another on a conical surface 43.

With reference to FIG. 3, the valve cartridge, as said, comprises two sections 6, 7 which can also be implemented to be separate from one another. In the embodiment example shown, however, they are formed as one piece. The first section is the release section 6.

In it a chamber is formed in which the release piston 25 is guided in such a manner that it can slide. In this chamber the release chamber 25 is formed on one side of the release piston 26 and the spring chamber 29 is formed on the other side of the release piston 26 and, on the outer circumferential surface of the release piston 26, is sealed by a sealing ring 28. The release chamber 25 is closed to the other side by a stopper 27. The stopper 27 is screwed into an inner thread at the end of the release cartridge 6 with the sealing ring 30. The stopper 27 limits, with a stop shaft, the mobility of the release piston 26. On its side opposite the release piston 26 the spring chamber 29 is bounded by a constriction 16 of the release cartridge 6 with the previously mentioned sealing ring on the inner circumferential surface of the constriction. This constriction is penetrated by the release shaft 32 fastened on the release piston 26 so as to be concentric with it and thereby bounds the spring chamber 29 between the seals 17 and 28. The release spring 33, or on the other side compression spring acting on the release piston 26, is supported on the constriction 16 and in the resting position, with its stop 31, presses the blocking [sic] piston 26 against the stopper 27. As said, the release piston 26 comprises on its outer circumferential surface a sealing ring 28 which seals the spring chamber 29 with respect to the release chamber 25. The previously mentioned control hole 9 in the release cartridge 6 empties onto the outer circumferential surface of the release piston 26 between this sealing ring 28 and the release chamber 25. Thus, the outer circumferential surface of the release piston 26 forms in this area a throttle gap decreasing with the movement of the blocking piston for slow filling of the release chamber 25 if the control port PST is pressurized with the control pressure. The spring chamber 29 is pressurized via the connector hole 15 with the pressure which is present in the connector port P/R. The non-return cartridge 7 forms in its interior space the connector chamber 34 on its side opposite the constriction 16 of the release section 6. The connector chamber 34 is pressurized, via the longitudinal duct 10 at the branch holes 14, with the pressure which is present in the port P/R. This is, controlled by a valve not represented, alternately the pump pressure or the return line pressure.

The connector chamber 34 is bounded in the area of the apical end of the non-return cartridge 7 by the non-return piston 35. This non-return piston is a component with the shape of a conical frustum and with a circular cylindrical edge 36 formed thereon.

The non-return section 7 of the valve cartridge comprises, as already described, on its apical side a conical surface 12 which empties out into the connector chamber 34. This conical surface acts as a seating face together with the similarly formed conical surface of the non-return piston 35. Furthermore, the non-return piston 35 is provided with a central hole and guided with this hole and a sealing ring 42 in such a manner that it can slide with sealing on the release shaft 32.

The release shaft 32 is made of one piece with the stop shaft 31 and the release piston 23 and is guided in such a manner that it can slide on the valve axis in the previously mentioned constriction of the release section 6. In the area in which the release shaft 32 runs through the connector chamber 34, the release shaft comprises an additional diameter tier with a diameter D7 which is reduced with respect to the diameter D6. With this diameter tier, as said, the release shaft passes through the non-return piston 35 and the sealing ring 37 and thereby seals the connector chamber 34 in the closed position of the non-return piston 35.

On one side the working chamber 38 is bounded by the non-return piston 35. On the other side the working chamber 38 is bounded by the release valve 18 still to be described. The working chamber 38 is constantly pressurized with the working pressure via the valve port A.

The release shaft 32 projects into the working chamber 38 and into a narrowed diameter tier of the valve hole. There a guide collar 39 is fastened by screwing onto the end of the release shaft and is guided in the valve hole in such a manner that it can slide but without sealing the valve hole. The guide collar 39 furthermore serves as a counterbearing for the non-return spring 40, with which the non-return piston 35 is pressed in the direction towards the seating face 12 or the stop 4 at the diameter tier D6/D7 of the release shaft 32.

The guide collar 39 comprises, facing the non-return piston 35, a cylindrical section on which the cylindrical edge 36 of the non-return piston is guided in such a manner that it can slide but does not seal and in which the previously described non-return spring 40 is housed.

FIG. 3 shows that in this development the valve cartridge 6, 7, which comprises, mounted therein, the release piston 26, the non-return piston 35, and the guide collar 39, forms a component which can be screwed out of the valve hole 2 by turning the release cartridge 6 and can be replaced by inserting and screwing in another component of this type.

With reference to FIG. 4, shown (enlarged with respect to FIGS. 1-3) is the discharge valve 18 with the discharge valve cartridge comprising a cartridge cap 21 and cartridge bushing 22.

In the discharge cartridge, i.e., cartridge bushing, a discharge piston 19 is guided in such a manner that it can slide with sealing by a sealing ring 42. This discharge piston 19 comprises a conical surface pointing towards the conical end area and forms with it a seat pairing 43 which is closed under the load of the compression spring 20 disposed in the spring space 26.

The discharge piston 19 is pressed by a discharge spring 20 into the seat 43. The spring space 45 is defined as a chamber by the sealing ring on the cartridge bushing 22 on one side and the sealing ring 42 on the discharge piston 19 on the other side. The discharge piston 19 projects with its side opposite the spring space into the working chamber 38.

The discharge piston 19 comprises a central duct 44 which connects the spring space 45 to the working chamber 38. The discharge piston 19 projects into the working chamber with a shaft 47 which runs through the diameter tier with the diameter D9 of the inner hole of the cartridge bushing leaving a sufficiently large gap, and, during movement of the apical face of the release shaft 32 leaving a certain free travel, works together with it. The cartridge bushing 22 and the cartridge cap 21 form, when assembled and screwed into the valve hole 3, an annular return chamber 46. This is connected to the valve port R and connected via it to the pressure in the return line of the longwall. This return chamber 46 is connected via a throttled branch duct 48 to a discharge chamber 49 which is formed between the sealing ring 42 on the discharge piston 19 and the seating face 43 on the discharge piston 19 due to the fact that the conical jacket on the discharge piston only covers the small inner area of the conical jacket on the cartridge bushing 22 but on its outer area forms a clear gap with the cartridge bushing 22. Thereby, the result is achieved that the hydraulically active face on the sealing ring 42 is greater than the hydraulically active face on the valve pairing 43. The working pressure which is present at both sides of the discharge piston 19 thus presses the discharge piston against the seat 43. The discharge spring 20 merely serves the purpose of the discharge piston always assuming a definite position.

Relating to the functions and to the operating states, in FIG. 1 the valve state in the resting position of the loaded operating cylinder is represented. At the working duct A a pressure of, for example, 400 bar is present. The pressure in the port P/R and the control duct PST corresponds to the return line pressure. The non-return valve piston 35 is pressed against its seat by the force of the non-return spring 40 and by the working pressure present at the apical face of the non-return piston and thus blocks the working port A with respect to the connector port P/R. The discharge piston 19 of the discharge valve is loaded on both sides with the working pressure of 400 bar. Since the hydraulically active face on the spring side (sealing ring 42) is greater than that of the seat side of the discharge piston 19, an hydraulic force, and in addition the discharge spring 20, acts on it in the closing direction so that the discharge piston lies on the valve seat 43 in such a manner that it seals and the working chamber is closed tight. The control port PST is without pressure or has a return line pressure, likewise the return line pressure prevails in the spring space 29 of the release piston.

The port P/R is connected, via a control valve not represented, to the pump port. In the connector chamber 34 a pressure builds up which is higher than the pressure in the working chamber 38. Under the pump pressure the non-return piston 35 is lifted from its seat 12 against the force of the spring 40 and releases the connection between the pump and the working chamber 38 until the pressure is equalized taking into account the spring force 40. Also in this operating state the release piston and the discharge valve remain inactivated.

The port P/R is connected to the return line by the control valve not represented. The working pressure in the working chamber 38 is supposed to be reduced. For this, the control port PST is pressurized with the control pressure, which is essentially equal to the prevailing working pressure. Thereby, the release piston 26, via the throttled control hole 9 and the throttle point on the piston's circumferential surface, is first pressurized, against the spring force 33, with the control pressure and, in the figure, traversed to the right until the apical face of the release shaft stops at the discharge piston 19 of the discharge valve 18 and lifts it from its seat and in so doing releases the connection of the working chamber 38, via the discharge chamber, to the return line. Due to the throttle action of the control duct 9 and the annular gap on the piston's circumferential surface 26, on the one hand, this movement is done very slowly and, on the other hand, small amounts of liquid are let through via the narrow branch duct 48 between the working chamber 38, the conical seat, and the discharge chamber 49. This throughflow is, however, not sufficient to reduce the working pressure, in the example 400 bar. In so doing, the non-return piston 35 continues to remain closed under the load of the spring and the hydraulic pressure on its apical side until the pressure equalization is established completely or partially. Through the structural choice of the ratios of the surface of the release piston 26 on the one hand and of the non-return piston 35 on the other hand, it can be effected, as already occurs in the known valve, that, first, a certain lowered working pressure or a certain pressure ratio must be reached before the force on the release piston 26 is sufficient to lift the non-return piston 35 from its seat and to connect the working chamber on this path to the return line.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A releasable non-return valve, comprising:
   a non-return piston and a discharge piston, configured to open and close a connection between a working chamber and a connector chamber, wherein each of the non-return piston and the discharge piston may be held in a closed position by a closing spring and a working pressure; and
   a release piston having a release shaft, that executes a release movement upon pressurization with a release pressure, wherein the release shaft engages the discharge piston and the non-return piston in a form-locking manner by means of a free apical face of the release shaft such that the discharge piston and the non-return piston are impelled into respective open positions,
   the non-return piston, the discharge piston, and the release piston with the release shaft being disposed so as to be concentric to one another on a common valve axis,
   wherein the release shaft extends through the non-return piston in such a manner that it can slide with sealing and, for opening, engages a non-return piston base by means of a diameter tier, the non-return piston is loaded in a closing direction by a main closing spring, and the discharge piston is guided in such a manner that it can move independently on the valve axis opposite a free end of the release shaft.

2. The non-return valve according to claim 1, wherein the discharge piston is pressurized with the working pressure and with equalized pressure on both sides and the working chamber closes with respect to a discharge chamber with a valve seat whose hydraulically active seat face is smaller than a hydraulically active piston face on its other side closing the discharge chamber.

3. The non-return valve according to claim 1, wherein the discharge piston is held in its closed position by a discharge closing spring.

4. The non-return valve according to claim 1, wherein a release chamber is formed in a release valve cartridge introduced into a valve housing, where the release piston is guided in said cartridge.

5. The non-return valve according to claim 4, wherein the release valve cartridge is formed as one piece with a non-return valve cartridge.

6. The non-return valve according to claim 1, wherein a discharge valve cartridge comprises a cartridge cap closed on one side and a cartridge bushing formed from a hollow, cylindrical body and closed by the cartridge cap to receive and guide the discharge piston in such a manner that it can be displaced, where the interior space of the cartridge cap and the cartridge bushing serves to receive a discharge closing spring and is connected to the working chamber.

7. The non-return valve according to claim 6, wherein the cartridge cap can be screwed onto a valve housing by means of an outer thread, and the cartridge bushing can be inserted into a cylindrical edge of the cartridge cap in such a manner that it seals.

8. The non-return valve according to claim 7, wherein the cartridge bushing is inserted by screwing the cartridge bushing into the cylindrical edge of the cartridge cap.

9. The non-return valve according to claim 1, wherein the free end of the release shaft, with a piston collar fastened on the release shaft and guided in a valve housing, projects into the working chamber, said piston collar serving to support the main closing spring of the non-return piston.

10. The non-return valve according to claim 1, wherein a constriction of a release cartridge is sealed with respect to the release shaft and forms a compensation chamber which is connected to the connector chamber in a throttled manner and can be pressurized with the pressure of the connector chamber.

11. The Non-return valve according to claim 1, wherein the release piston is pressed into a resting position by a release spring which is supported on a constriction of the release cartridge.

12. The non-return valve according to claim 1, wherein a control duct empties onto a circumferential surface of the release piston and empties out into a release chamber via a throttle gap formed on the circumferential surface of the release piston.

13. The non-return valve according to claim 1, wherein the release piston is pressurized with a system pressure, and a surface ratio of hydraulically active surfaces on the non-return piston and on the release piston is such that the release for opening the non-return piston is only sufficient when the working pressure has dropped below a predetermined value.

* * * * *

UNITED STATES PATENT AND TRADEMARK OFFICE
CERTIFICATE OF CORRECTION

| | | |
|---|---|---|
| PATENT NO. | : 7,357,152 B2 | Page 1 of 1 |
| APPLICATION NO. | : 11/622286 | |
| DATED | : April 15, 2008 | |
| INVENTOR(S) | : Kussel | |

It is certified that error appears in the above-identified patent and that said Letters Patent is hereby corrected as shown below:

Column 12,

Lines 4 and 5 claim 13, "the release for opening" should read --the release pressure for opening--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,357,152 B2 | Page 1 of 1 |
| APPLICATION NO. | : 11/622286 | |
| DATED | : April 15, 2008 | |
| INVENTOR(S) | : Kussel | |

It is certified that error appears in the above-identified patent and that said Letters Patent is hereby corrected as shown below:

Title page,
Item (63), "filed on July 12, 2004" should read --filed on July 1, 2005--.

Column 1,
Line 7, "filed July 12, 2004" should read --filed July 1, 2005--.

Signed and Sealed this

Twenty-sixth Day of May, 2009

JOHN DOLL
*Acting Director of the United States Patent and Trademark Office*